United States Patent
Buchanan et al.

(10) Patent No.: US 9,336,446 B2
(45) Date of Patent: May 10, 2016

(54) DETECTING MOVING VEHICLES

(71) Applicant: BAE SYSTEMS PLC, London (GB)

(72) Inventors: Roderick Buchanan, Preston (GB); James Duncan Revell, Bristol (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 14/418,473

(22) PCT Filed: Jul. 25, 2013

(86) PCT No.: PCT/GB2013/051989
§ 371 (c)(1),
(2) Date: Jan. 30, 2015

(87) PCT Pub. No.: WO2014/020315
PCT Pub. Date: Feb. 6, 2014

(65) Prior Publication Data
US 2015/0262018 A1    Sep. 17, 2015

(30) Foreign Application Priority Data
Jul. 31, 2012 (GB) .................................. 1213604.0

(51) Int. Cl.
| | |
|---|---|
| G06K 9/00 | (2006.01) |
| G06T 7/20 | (2006.01) |
| G06K 9/64 | (2006.01) |
| G06K 9/32 | (2006.01) |
| G08G 1/16 | (2006.01) |

(52) U.S. Cl.
CPC ........ *G06K 9/00771* (2013.01); *G06K 9/00805* (2013.01); *G06K 9/3241* (2013.01); *G06K 9/64* (2013.01); *G06T 7/2053* (2013.01); *G06T 2207/10016* (2013.01); *G06T 2207/10032* (2013.01); *G06T 2207/30241* (2013.01); *G06T 2207/30252* (2013.01)

(58) Field of Classification Search
CPC ..................................... G06K 9/00; G06T 7/00
USPC .......... 382/103, 104, 107, 236; 340/436, 903, 340/950; 348/118, 169, 171–172, 352, 837
See application file for complete search history.

(56) References Cited

U.S. PATENT DOCUMENTS

| | | | |
|---|---|---|---|
| 4,257,703 A * | 3/1981 | Goodrich | G01S 11/12 340/436 |
| 8,098,889 B2 * | 1/2012 | Zhu | B60W 40/02 340/907 |
| 2006/0177099 A1 | 8/2006 | Zhu et al. | |
| 2006/0262959 A1 | 11/2006 | Tuzel et al. | |
| 2009/0309966 A1 | 12/2009 | Chen et al. | |
| 2012/0154579 A1 | 6/2012 | Hampapur et al. | |

OTHER PUBLICATIONS

GB Search Report dated Dec. 3, 2012 of Patent Application No. GB1213604.0 filed Jul. 31, 2012, 3 pages.

(Continued)

*Primary Examiner* — Abolfazl Tabatabai
(74) *Attorney, Agent, or Firm* — Maine Cernota & Rardin

(57) ABSTRACT

A method of detecting at least one moving vehicle includes receiving (202) image data representing a sequence of image frames over time. The method further includes analyzing (204-206) the image data to identify potential moving vehicles, and comparing (208-212) at least one said potential moving vehicle with a vehicle movement model that defines a trajectory of a potential moving vehicle to determine whether the at least one potential moving vehicle conforms with the model.

14 Claims, 2 Drawing Sheets

(56) References Cited

OTHER PUBLICATIONS

PCT Search Report dated Oct. 23, 2012 of PCT Application No. PCT/GB2013/051989 filed Jul. 25, 2013, 3 pages.
Mejias, L. et al., "Vision-Based Detection and Tracking of Aerial Targets for UAV Collision Avoidance", Intelligent Robots and Systems, IEEE, 2010, pp. 87-92.
Amit Kumar K C et al., "Demo: Spatio-Temporal Template Matching for Ball Detection", IEEE International Conference, Aug. 22, 2011, pp. 1-2.
Ayer S. et al., "Segmentation of Moving Ojects by Robust Motion Parameter Estimation Over Multiple Frames", Proceedings of Third European Conference on Computer Vision, May 2-6, 1994, pp. 316-327.

* cited by examiner

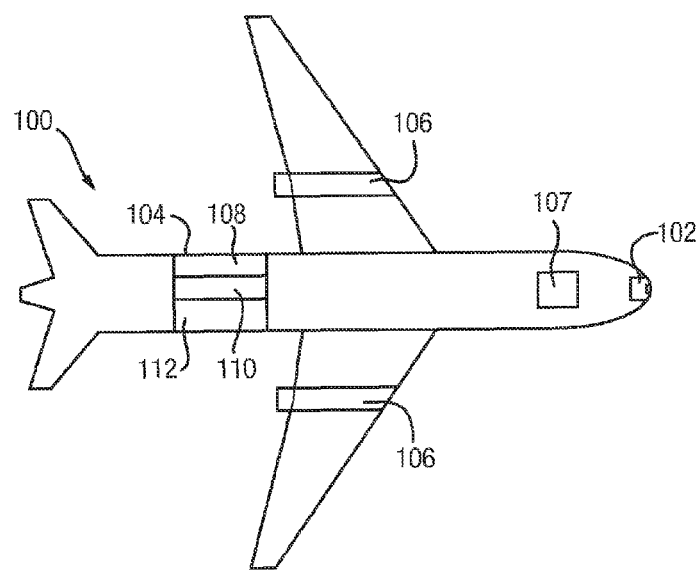
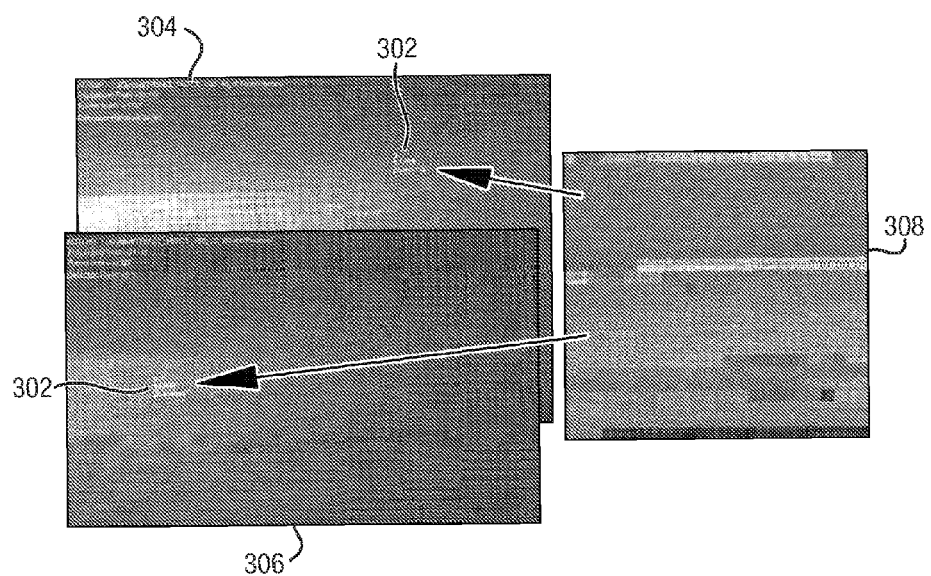

DETECTING MOVING VEHICLES

RELATED APPLICATIONS

This application is a US National Phase Application filed under 35 USC 371 of PCT Application No. PCT/GB2013/051989, filed 25 Jul. 2013, which claims the benefit of GB Application No. GB1213604.0, filed 31 Jul. 2012. Each of these applications is herein incorporated by reference in their entirety for all purposes.

The present invention relates to detecting moving vehicles.

The growth in Uninhabited Air Systems (UAS) and a desire for their routine use in place of manned aircraft for common operational missions is presenting a major technology and regulatory challenge to the aerospace industry. A number of new technology areas need significant development and validation to provide the UAS with the equivalent functionality needed to replace the human pilot's role in ensuring safe operation.

Current medium/large UAS (>150 Kg) operation requires strict segregation from other airspace users or burdensome additional safety measures such as a chase aircraft. For example, in the UK it has been mandated that an approved method of aerial collision avoidance is required and, therefore, UAS operations will not be permitted in the United Kingdom in non-segregated airspace, outside the direct unaided visual line-of-sight of the pilot, without an acceptable sense and avoid system. UAS technology and generation of a regulatory consensus on its certification and acceptance require significant progress to overcome barriers to the goal of unrestricted access to National Airspace Systems (NAS) alongside conventional air traffic.

Emerging UAS regulations are based on the principle that UAS operations should be of an equivalent level of safety to current manned aircraft operations and transparent to all existing users of NAS. This means that UAS operations should not introduce any greater risk to other airspace users than currently exists and also that UAS should be able to be handled in the same way as current manned aircraft by all airspace participants.

The underlying principle of UAS equivalence in emerging regulations for unrestricted UAS airspace access is particularly relevant to the key technology area of collision avoidance systems for UAS (commonly referred to as 'Sense and Avoid' or Detect and Avoid'). A cornerstone of aviation safety has always been the function of the pilot to avoid collisions by looking through the window of the aircraft. 'See and Avoid' refers to the process whereby "vigilance shall be maintained by each person operating an aircraft so as to see and avoid other aircraft". A baseline requirement for UAS collision avoidance is that a UAS Sense and Avoid system must provide, at least, "a capability and level of safety which is equivalent to the existing 'see and avoid' concept". The provision of a functional equivalence to this 'see and avoid' capability has become one of the more formidable barriers to entry into the National Airspace System for unmanned aircraft systems.

Future mandates in Europe and the United States for Automatic Dependent Surveillance Broadcast (ADS-B) equipage for most aircraft will mean that increasingly, aircraft will 'co-operate' with UAS collision avoidance systems by regularly broadcasting their Global Positioning System (GPS) position. Reliance on such cooperation alone is unlikely to achieve the required level of safety due to a lack of total equipment equipage coverage, inherent security weaknesses, variable performance, and inevitable equipment malfunctions. Additionally there will always be the requirement for the detection of 'non-cooperative' traffic, such as gliders, hot air balloons, and aircraft where position broadcast has failed. It is also expected that a single sensor solution will not meet the integrity requirements for a safety critical application and that a multi dissimilar sensor approach will be required to provide a form validation for sensor measurements.

A key requirement for the perfect aircraft detection algorithm is to detect an aircraft as soon as the sensor can resolve it. This produces the situation where high resolution cameras are frequently used to sense aircraft that initially appear in the image at a low resolution. This makes the efficient and robust estimation of the position or appearance of aircraft using image processing techniques difficult. These challenges are continuously being addressed, motivating much of the research in this problem area.

A common approach for detecting aircraft on a collision path is to use the contrast ratio between the target and background. This is based on the observation that the aircraft will appear either brighter or darker than its background. Grey-level morphology algorithms are used to detect the local peaks in contrast. Typically, the binarised outputs from a top and bottom hat filter are used to generate detections for downstream algorithms.

Unfortunately, these approaches assume that aircraft during flight are of high contrast and maintain a constant dark or bright intensity. They also assume that a single structured morphology element with specified orientation, size and shape is suitably generic for detecting all aircraft from all distances and angles. Furthermore, it is well-known that morphology techniques are computationally intensive requiring parallelised implementation or dedicated hardware to meet real-time requirements. Finally, morphology approaches are noted as returning a large number of false positives with computationally intensive techniques used to post-process the detections. In general, many of the known proposed solutions require many parameters hindering deployment on unmanned air vehicles.

Detection of other types of moving vehicles, e.g. road or water-based vehicles, is also a known problem in other application areas.

US2006/177099 describes a system and method of detection specifically intended for on-road vehicles. A video sequence is received that is comprised of a plurality of image frames and a potential vehicle appearance is identified in an image frame. Known vehicle appearance information and scene geometry information are used to formulate initial hypotheses about vehicle appearance. The system is reliant upon known vehicle appearance information and scene geometry information and uses a probability model obtained from known vehicle and non-vehicle training samples.

Embodiments of the present invention are intended to address at least some of the problems discussed above. The present inventors have developed a vehicle, e.g. aircraft, detection method that is intended to address the requirements of real-time processing, early aircraft detection and low false positive rates. Embodiments of the invention provide an optical based component of a sense and avoid system that is capable of detecting potentially conflicting aircraft, with the performance of such an optical system being equivalent to, or exceeding, that of a human.

According to a first aspect of the present invention there is provided a method of detecting at least one moving vehicle, the method including or comprising:

receiving image data representing a sequence of image frames over time;

analysing the image data to identify potential moving vehicles;

comparing at least one said potential moving vehicle with a vehicle movement model that defines a trajectory of a potential moving vehicle to determine whether the at least one potential moving vehicle conforms with the model.

The method can further include:

analysing directional data relating to a said moving vehicle determined to conform with the vehicle movement model to determine if the moving vehicle is moving towards, away or across with respect to a location where the image data was captured.

The directional data analysing can include analysing monocular visual depth cue relating to a said moving vehicle.

The directional data analysing can include:

maintaining a count of pixel density of each said moving vehicle over a sequence of said image frames, and computing a rate of change of pixel density count over time, wherein if the rate is constant then the moving vehicle is determined to be moving across with respect to the location;

if the rate is positive then the moving vehicle is determined to be moving towards the location, and if the rate is negative then the moving vehicle is determined to be moving away from the location.

Each said image frame in the sequence can be defined by a set of pixels/image elements and the step of analysing the image data to identify the potential moving vehicles can include:

generating time-rate of intensity change estimations for corresponding pixels of the image frames;

extracting minima and maxima said time-rate of intensity change from the estimations;

identifying the minima and maxima as said potential moving vehicles.

The step of generating time-rate of intensity change estimations may comprise estimating first order temporal derivatives for the corresponding pixels.

The step of comparing at least one said potential moving vehicle with the vehicle movement model can include defining a local region window within a said image frame based around a said pixel corresponding to a said potential moving vehicle. The local region window can be used to support a best fitted model using linear least squares estimation. A size of the local region window can be set by a user and can provide an upper bound on proximity of multiple detections in the image frame in order for the pixels to be associated with a single said vehicle.

The method can include generating the vehicle movement model that defines the trajectory of a said potential moving vehicle. The method can include generating a corresponding model fitting error for the local region window of the potential moving vehicle.

The trajectory can provide an estimation of velocity and direction of the potential moving vehicle over a finite period of time. The model fitting error may give an indication of confidence in accuracy of the detection. For a said vehicle movement model, the method can predict a future said trajectory. The method can use a constant velocity model for the future trajectory prediction. Using the trajectory prediction, a 2D Gaussian is defined to weight any maxima or minima from the two-dimensional derivative space.

According to other aspects of the present invention there are provided apparatus configured to execute methods substantially as described herein.

According to another aspect of the invention there is provided apparatus configured to detect at least one moving vehicle, the apparatus including or comprising:

a device configured to receive image data representing a sequence of image frames over time;

a device configured to analyse the image data to identify potential moving vehicles; and a device configured to compare at least one said potential moving vehicle with a vehicle movement model that defines a trajectory of a potential moving vehicle to determine whether the at least one potential moving vehicle conforms with the model.

According to a further aspect of the present invention there is provided apparatus substantially as described herein and at least one image capturing device.

According to yet another aspect of the present invention there is provided a vehicle, e.g. aircraft, including apparatus substantially as described herein. The apparatus may in some cases control a navigation system of the vehicle.

According to other aspects of the present invention there are provided computer program elements comprising: computer code means to make the computer execute methods substantially as described herein. The element may comprise a computer program product.

According to yet another aspect of the present invention there is provided a method of generating a vehicle movement model substantially as described herein.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which:

FIG. 1 is a block diagram of an aircraft fitted with an example aircraft detection system;

FIG. 3 shows an example visual output from the example system.

Figure 2:
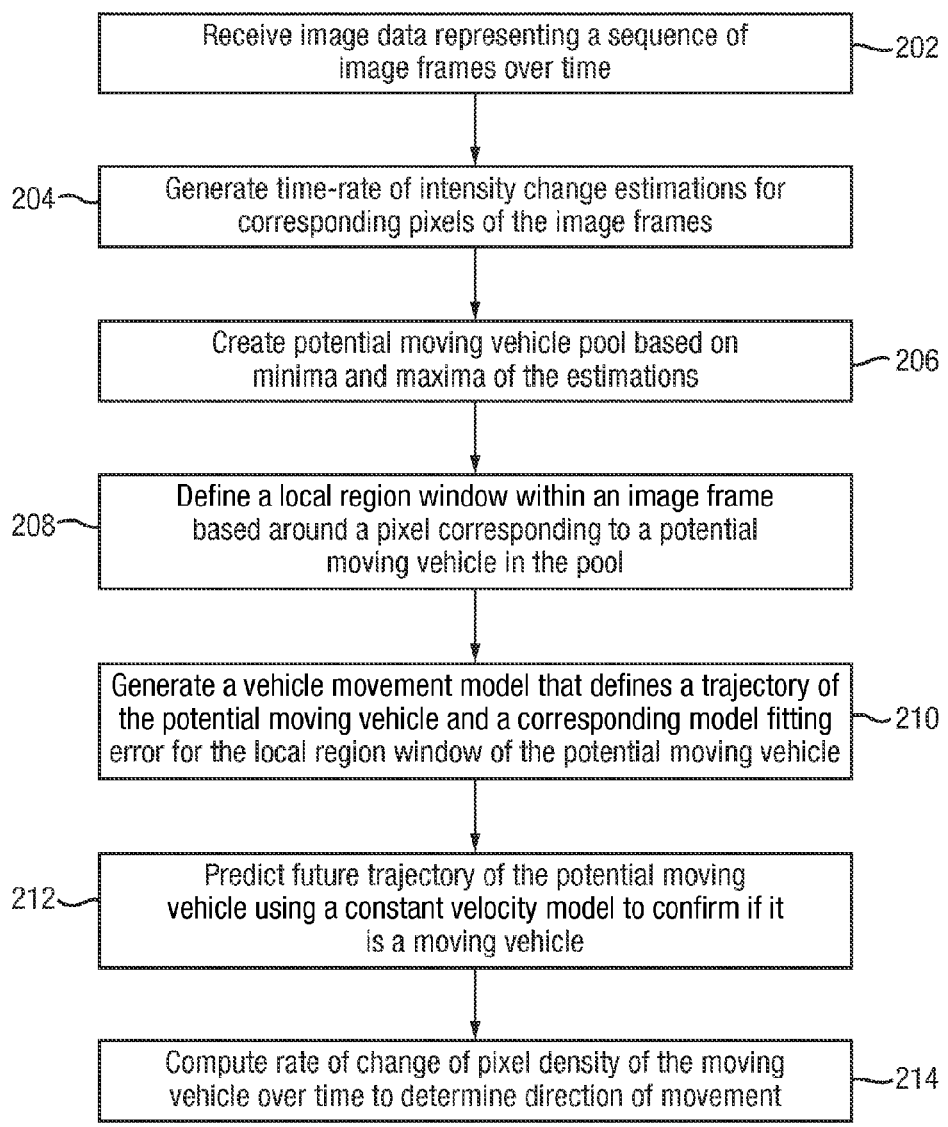
FIG. 2 is a flowchart showing steps than can be performed by the example system.

The approach taken by the present inventors to develop and test the aircraft detection method was to capture camera footage from a number of encounters with a realistic target aircraft with different crossing angles, distances, backgrounds, relative heights and, sun positions. This data was then used to investigate and mature the method. An ultimate goal of the development was to be able to run the detection method with a tracker in real-time on a representative flight system and integrate with a prototype Sense and Avoid system to give adequate collision avoidance performance against a non-cooperative target.

FIG. 1 shows a schematic representation of aircraft 100 including an image capture device 102 that is communication with a computing device 104. The aircraft and computing device can be of any conventional type and include known features (e.g. engines 106 and flight controller 107 for the aircraft, and processor 108, storage device 110 and communications interface 112 for the computing device) that need not be described herein in detail. The image capture device can also be any type of device capable of capturing images, which can be in digital format, or capable of being transformed into digital format for processing by the computing device.

In the example embodiment, the aircraft 100 comprised a Jetstream 31 aircraft (G-BWWW) as a Flying Test Bed (FTB), configured as a surrogate Unmanned Air Vehicle (UAV), and a Commercial Off-The-Shelf (COTS) Electro Optic (EO) 'machine vision' camera was used as the image capture device 102. The camera was matched to a lens to give angular resolution slightly better than human 20/20 vision (1 min. of arc). The camera operates with 2456×2058 pixel resolution and is capable of a genuine acquisition rate of 15 Hz. The choice of a visible band camera was due to its performance being roughly equivalent to the human eye, positive size, weight and, power (SWAP) characteristics, low cost, and, ease of integration.

In one embodiment, a single camera 102 was mounted in the cockpit central window to give a representative 'pilot's eye' view. In other embodiments intended to provide a full optical collision avoidance system then an array of cameras to give the required Field of View (FOV) of +/−110 deg. from the aircraft's nose could be provided. This is because the camera can only achieve the angular resolution requirement over a limited FOV due to its finite pixel resolution. Therefore, multiple cameras are required to achieve the full FOV at the required angular resolution. In multiple camera embodiments, known data fusion techniques can be used to incorporate image data provided by the plurality of cameras into the processing method described herein.

FIG. 2 is a flowchart showing example steps that can be performed by the processor 108, based on code stored in memory 110. It will be understood that the flowcharts shown is exemplary only and in other embodiments some of the steps can be omitted and/or re-ordered. The steps can be implemented using any suitable programming language and data structures. Although the embodiment shows the computing device 104 onboard the aircraft being used to detect other aircraft (and could either sound an alarm for a pilot if one on a collision course is detected, or control the flight path in an autonomous craft, e.g. by controlling flight controller 107), it will be understood that the set up can be varied. For instance, the image capture device 102 and/or the computing device 104 may not be fitted onboard the vehicle, e.g. at least one of them could be on a ground station and exchange data/messages with the aircraft. It will also be understood that embodiments of the method can be produced to detect moving vehicles other than aircraft, and also versions can be produced for use with/on other types of vehicles or (static or moving) bodies.

At step 202, the computing device 104 executing the method receives image data representing a sequence of image frames over time. These will typically be received substantially in real time over a (wired or wireless) communications link between the computing device 104 and the image capturing device 102. The images may be video data, or a sequence of still images captured over a time period (intervals between the still images which may or may not correspond to the image capture rate of the device 102). The image data can be in any suitable format, e.g. MP4, and in some cases may undergo additional processing steps, such as analogue-to-digital conversion, decryption and/or decompression. To achieve real-time performance in some embodiments, the inventors chose to process Bayer data directly from the camera. This meant that computationally costly demosaic interpolation colour filter conversions could be avoided.

The moving vehicle detection method can make measurements/receive images at every time step, but may utilise a fixed sliding window approach for processing them. This defines a set period of time that is shifted at each time step and is dependent on the camera frame rate. It provides the upper bound on the accepted velocity of an aircraft, where different values are suitable for aircraft with different velocities. One embodiment of the method used a temporal window size of 5 steps for this parameter. This meant that by using the camera described above, a track could not be designated quicker than $\frac{1}{3}$ seconds. By taking into account an algorithm maximum computation time of $\frac{1}{6}$ seconds, this compares favourably with human equivalence information suggesting that a pilot can designate a track in 1 second.

At step 204, the method performs numerical estimation of the first order temporal derivatives at each time step to generate approximate time-rate of change of intensity at every point in the image. This is a linear constraint and on its own it does not allow calculation of either translational components of the image velocity or normal flow magnitude. In one embodiment, the estimates may be Laplacian first order temporal derivatives, but it will be understood that other techniques could be used, e.g. image differencing where two successive frames are subtracted.

The computational complexity of the procedures used in the method will now be discussed briefly. Herein, computational complexity refers to the growth rate of the resources, for example time or memory, required with respect to the size of the data processes. The known O-notation from Computer Science is used to provide the upper bound of complexity of the algorithms that make up the approach. Step 202 essentially reduces each image frame from a video feed to a set of two-dimensional points in image coordinates. These extracted point features are dependent on spatial and temporal information. The first order temporal derivatives algorithm involves operations on m matrices each the size of the image $n^2$. No sub-sampling of the image data is carried out to reduce the size of n, since the ideal detector must have the ability to detect an aircraft as soon as the sensor can resolve it. The overall running time of this algorithm is given as $O(mn^2)=O(m-1)O(n^2)$. The quadratic complexity term means that the instruction count increases by the square of the number of elements (pixels) in the image; this is only an upper bound for the growth rate. Therefore, for large images of the order of megapixels the routine may have poor scalability; however, at this stage the total number of instructions in the algorithm is extremely low. Profiling using current Intel™ hardware shows the processing time to be approximately 20 ms for a single frame.

Instead of computing spatial derivatives, the present inventors decided to dynamically threshold the two-dimensional temporal derivative space. The method extracts points of maxima and minima rate of intensity change. A single parameter is required for this, which is dependent on the quality of the intensity information, and provides an upper bound on the accepted contrast for an aircraft.

The present inventors speculated that these positions of maxima and minima correspond to locations in the image coordinate frame that project to points on possible aircraft in the world, but could also be points on the ground or cloud. At step 206, all these maxima and minima detections are stored and herein are referred to as a "target pool" of potential moving vehicles. The target pool also contains position detections from previous time increments identified during the sliding time window. At this stage the number of candidate targets in the pool is large and with a large number of outliers which need to be identified.

Regarding the computational complexity of these steps of the method, the size of the target pool is denoted as p and exists in the interval $0 \leq p \leq n^2$, reducing to the number of detected aircraft in the scene. Several algorithms can be used for the reduction, by discriminating between feature points that are potentially aircraft and non-aircraft. The first (step 206, which can comprise a feature extraction technique) can comprise a binary search with complexity O(log p), returning feature points k in the target pool that are spatially bounded within the same region of the image. Secondly, a data association algorithm (step 208) is executed with complexity $O(k^2)$ where k<<p. Finally, a model fitting algorithm (steps 210 and 212) is used to allow both measurement smoothing and detection predictions, whilst also providing an error measure used for detection confidence. The runtime complexity is O(b), where b is the number of points used to determine the model coefficients, because a single loop iterates b times to compute a set of summations. A user input parameter can be used to bound the maximum size of the target pool to prevent illumination changes causing gross detection errors. Again, profiling using the same hardware as mentioned above shows the processing time to be approximately 10 ms for a single frame. There can be other executed statements in embodiments of the method; however, these are insignificant in terms of complexity and referred to as c. As a final point, the overall running time of the algorithms that make up embodiments of the method can be given as max($O(mn^2)$, $O(k^2)$, O(b), c), ordered from high to low.

Local regions in the target pool are used to support a best fitted model using linear least squares estimation, although it will be appreciated that alternative techniques, e.g. non-linear model or Kalman filter fusion technique could be used. The local regions are defined at step 208 using a window that restricts data association possibilities, whilst keeping detection chronological ordering. A local region can be thought of as a number of pixels surrounding a pixel in the target pool. The latter is important, because whilst optical flow uses the sequence of rendered images to allow the estimation of motion, we similarly use the sequence of ordered points in the target pool. The size of the window is an algorithm parameter, which can be set by a user. It provides an upper bound on how close multiple detections in the image coordinate frame can be to be associated to a single aircraft during the time window.

At step 210, a linear model is output that defines a clipped trajectory and a corresponding model fitting error per local region. This can be done by means of a linear least squares fitting technique, which is a form of linear regression for calculating the best fit. The clipped trajectory allows estimation of velocity and direction for a finite period of time bounded by the sliding window. The model fitting error gives an indication of confidence on the accuracy of the detection. For example, if this is high then the relevant points in the target pool do not follow a trend and consequently the detections are unlikely to be an aircraft.

For each model, the method at step 212 then predicts forward the trajectory in the image coordinate frame. Since the prediction is used at the next time step, it only needs a myopic predication for a fixed period of time. This allows the method to use a constant velocity model, which is reasonable, since during this short time period it is assumed that the aircraft will have a smooth and non-erratic motion in the image plane. The prediction is for a constant finite small amount of time into the future (e.g. less than 1 second). The prediction assumes that aircraft moves with constant velocity from its last observed position and the sensing aircraft stays at a constant orientation. Using the target position prediction in the image coordinate frame, a 2D Gaussian is defined to weight any maxima or minima from the two-dimensional derivative space. This also has the effect of suppressing any noisy responses that may exist elsewhere. The mean and variance parameters are both algorithm parameters that we have chosen to be static.

Finally, at step 214, in order to determine whether an aircraft is on a collision path the method can use a monocular visual depth cue. More specifically, the method exploits the perceived relative size, so that for aircraft that subtends a larger visual angle the closer the aircraft is to the sensor. This can depend on the performance of the detection and tracking of the aircraft. A recursive algorithm maintains a count of the pixel density of each detected aircraft. This produces the size of the aircraft in pixels along the clipped trajectory, for a bounded period of time, for a set of associated aircraft positions in the image plane. The method then takes the derivative of the perceived relative aircraft size information to determine if the rate of change is constant, positive or negative. This is then mapped to an aircraft flying either: (1) across, (2) approaching or (3) receding in the image coordinate frame.

FIG. 3 shows an example visual output from the aircraft detection method. A single aircraft (on a non-collision path) 302 of only approximately 4×10 pixels in size traverses the image, moving from regions of sky to cloud. On the left are two sample video frames 304, 306 with the aircraft delineated in a circle. To the right are all the thumbnails 308 of the aircraft during its flight. The thumbnails make it easy to see which detections are correct or not during the flight, the variation in appearance in terms of size and shape and colour against the sky and cloud. For all test files, the method executed at no less than 30 Hz at full resolution.

For aircraft on a non-collision path, the quantity and quality of appearance-based information will vary depending on the aircraft flight paths. This differs to aircraft on a collision path where the appearance information will always increase as the range between aircrafts is reducing. In both situations aircraft will always exhibit significant translational displacement in the image coordinate frame, except during a head-on collision where the sensed aircraft will appear to have negligible or zero translational displacement. This displacement will also be different to the apparent egomotion of the sensing aircraft. Embodiments of the aircraft detection method exploits this by using both spatial and temporal information. It is intentional that the algorithm does not compensate for the egomotion of the sensing aircraft. This is to eliminate the need for a localisation solution and consequently to provide a non-GPS solution. However, to achieve this requires accurate aircraft detections. The only time that the aircraft pose is needed is to transform all designated tracks from the image coordinate frame to a coordinate frame defined as having the local position of the IMU with the global rotations of the aircraft. Also, the aircraft detection method does not use a Kalman filter to fuse detection measurements. This is to allow the output to be used as an input to downstream tracking systems that may include such statistical estimators, since the overall system may not have time-correlated process and measurement errors. In embodiments of the method, target detection is deterministic and unsupervised, which is advantageous for meeting UK Civil Aviation Authority approval as the approach can be formally evaluated. Embodiments are not reliant on known vehicle appearance information or scene geometry information; instead, they can use rate of change information in the scene so that any moving object can be potentially detected as a target vehicle. Not using scene geometry information is beneficial as this can be a source of error.

The invention claimed is:

1. An autonomous method of detecting substantially in real-time at least one moving vehicle, the method comprising:

receiving image data, from an image capturing device, representing a sequence of image frames over time;

autonomously analysing, in a computer, substantially in real-time, the image data to identify potential moving vehicles; and comparing, in said computer, at least one said potential moving vehicle with a vehicle movement model that defines a trajectory of a potential moving vehicle to determine whether the at least one potential moving vehicle conforms with the model; wherein said vehicle movement model comprises analysing directional data relating to a said moving vehicle determined to conform with the vehicle movement model to determine if the moving vehicle is moving towards, away or across with respect to a location where the image data was captured.

2. A method according to claim 1, wherein the directional data analysing includes analysing monocular visual depth cue relating to a said moving vehicle.

3. A method according to claim 2, wherein the directional data analysing includes:

maintaining a count of pixel density of each said moving vehicle over a sequence of said image frames, and computing a rate of change of pixel density count over time, wherein if the rate is constant then the moving vehicle is determined to be moving across with respect to the location;

if the rate is positive then the moving vehicle is determined to be moving towards the location, or if the rate is negative then the moving vehicle is determined to be moving away from the location.

4. A method according to claim 1, wherein each said image frame in the sequence is defined by a set of image elements and the step of analysing the image data to identify the potential moving vehicles can include:

generating time-rate of intensity change estimations for corresponding pixels of the image frames;

extracting minima and maxima said time-rate of intensity change from the estimations;

identifying the minima and maxima as said potential moving vehicles.

5. A method according to claim 4, wherein the step of generating time-rate of intensity change estimations comprises estimating first order temporal derivatives for the corresponding image elements.

6. A method according to claim 4, wherein the step of comparing at least one said potential moving vehicle with the vehicle movement model includes defining a local region window within a said image frame based around a said pixel corresponding to a said potential moving vehicle.

7. A method according to claim 6, wherein the local region window is used to support a best fitted model using linear least squares estimation.

8. A method according to claim 7, wherein a size of the local region window is configurable by a user and sets an upper bound on proximity of multiple detections in the image frame in order for the pixels to be associated with a single said vehicle.

9. A method according to claim 6, including generating the vehicle movement model that defines the trajectory of a said potential moving vehicle and generating a corresponding model fitting error for the local region window of the potential moving vehicle, wherein the trajectory provides an estimation of velocity and direction of the potential moving vehicle over a finite period of time, and the model fitting error gives an indication of confidence in accuracy of the detection.

10. A method according to claim 9, where, for a said vehicle movement model, the method further predicts a future said trajectory of the moving vehicle.

11. A method according to claim 10, wherein a constant velocity model is used for the future trajectory prediction.

12. A method according to claim 11, wherein a 2D Gaussian is defined to weight any maxima or minima.

13. A non-transitory computer-readable storage medium storing a computer program element comprising:

computer code means to make the computer execute a method according to claim 1.

14. Apparatus configured to autonomously detect at least one moving vehicle, substantially in real-time, the apparatus comprising:

a device configured to receive image data representing a sequence of image frames over time;

a device configured to autonomously analyse, substantially in real-time, the image data to identify potential moving vehicles, and a device configured to compare at least one said potential moving vehicle with a vehicle movement model that defines a trajectory of a potential moving vehicle to determine whether the at least one potential moving vehicle conforms with the model; wherein said vehicle movement model comprises analysing directional data relating to a said moving vehicle determined to conform with the vehicle movement model to determine if the moving vehicle is moving towards, away or across with respect to a location where the image data was captured.

* * * * *